2 Sheets—Sheet 1.

J. E. CRISP.
Mechanical Movement.

No. 210,452. Patented Dec. 3, 1878.

WITNESSES
A. J. Oettinger
Geo. F. Walker

INVENTOR
Joseph E. Crisp.
by his attys
Clarke & Raymond

2 Sheets—Sheet 2.

J. E. CRISP.
Mechanical Movement.

No. 210,452. Patented Dec. 3, 1878.

WITNESSES
A. J. Oettinger
Geo. F. Walker

INVENTOR
Joseph E. Crisp
by his attys
Clarke & Raymond

UNITED STATES PATENT OFFICE

JOSEPH E. CRISP, OF BOSTON, ASSIGNOR OF TWO-THIRDS HIS RIGHT TO GEORGE W. COPELAND, OF MALDEN, AND THE REMAINING ONE-THIRD TO WILLARD COMEY, OF WESTBOROUGH, MASSACHUSETTS.

IMPROVEMENT IN MECHANICAL MOVEMENTS.

Specification forming part of Letters Patent No. 210,452, dated December 3, 1878; application filed October 11, 1878.

*To all whom it may concern:*

Be it known that I, JOSEPH E. CRISP, of Boston, in the county of Suffolk, in the Commonwealth of Massachusetts, have invented an Improved Mechanical Movement, of which the following is a specification:

This invention has for its object the following-described mechanical movement for providing a cross-head, first, with a reciprocating motion having a stroke of greater length than the stroke of the bar or other actuating mechanism which operates it; second, with a change of position in relation to the connecting-bar or other mechanism operating the same.

It further consists in the following-described means for varying the length of stroke of a connecting-bar without changing any of the mechanism operating said connecting-bar.

Figure 1:
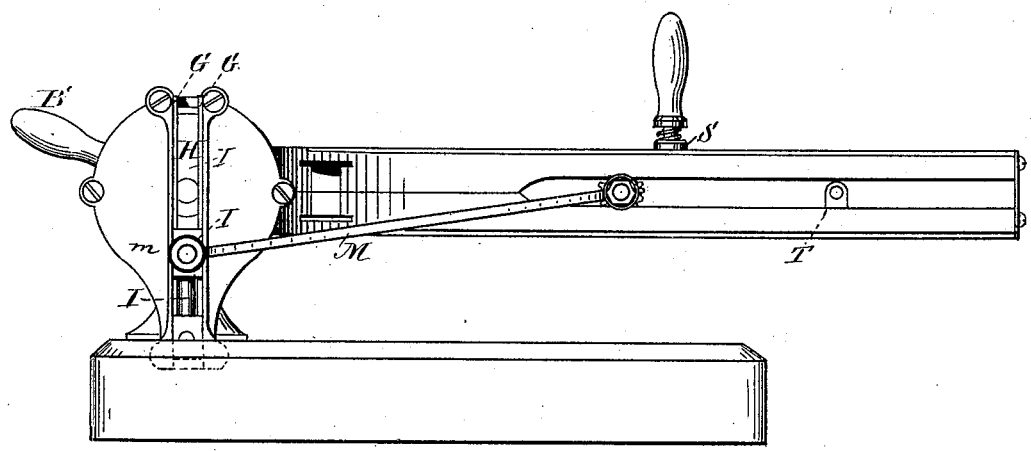
Figure 2:
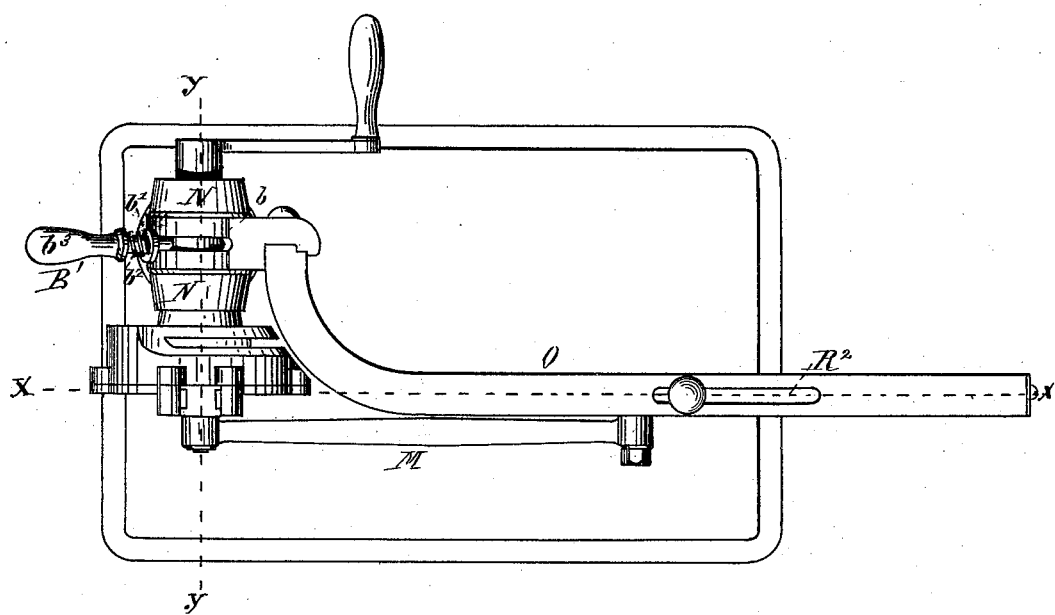
Figure 3:
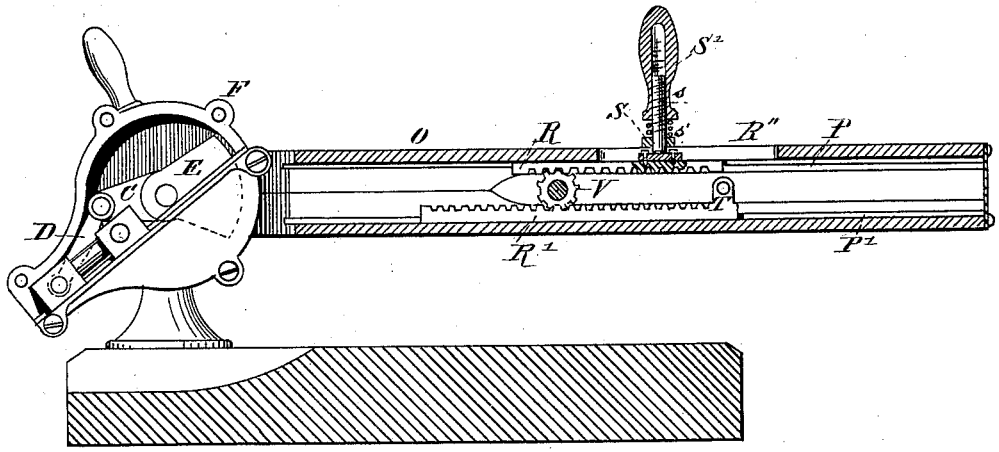
Figure 4:
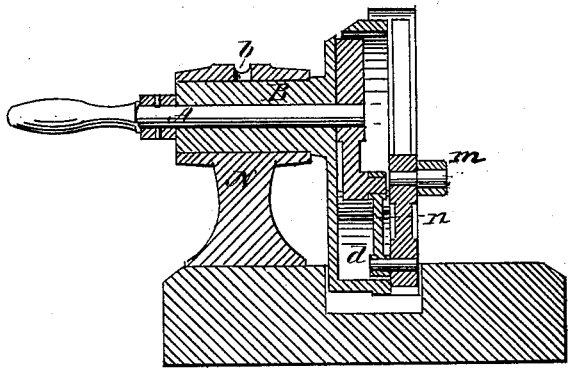

In the drawing, Figure 1 is a perspective of my invention. Fig. 2 is a plan of the same. Fig. 3 is a vertical section of the line X X of Fig. 2. Fig. 4 is a cross-vertical section of the line Y Y of Fig. 2.

Prior to my invention no simple mechanism was known for readily adjusting the length of travel or stroke of a reciprocating cross-head, carrier, or feed motion while the same was in motion. Neither was there any mechanism by which the stroke of a cross-head, carrier, or feed motion could be varied in distance from the crank or driving mechanism while in operation.

By my invention I am enabled to secure upon any machine using it a movement of the cross-head, carrier, feed-motion, or any part of the mechanism which it may be desirable to provide with the adjustments hereinafter named in performing the work of the machine with a stroke of any desirable length, in any desirable position in relation to the connecting-bar or other actuating mechanism, to vary the same instantaneously while the machine is in operation, and, if necessary, may provide the same with two short strokes at every revolution of the driving-shaft.

The uses to which this movement may be applied are very numerous. It or portions of it may be used for operating a cross-head or carrier supporting a tool for performing work which requires a reciprocating movement of a tool varied in length and in position; or it may be used as a feed-motion in presenting work to a tool when it is necessary that such feed-motion shall be varied in length and in position, or in both, instantaneously while the machine is in operation; and by making the guides, hereinafter described, an arc with a radius equal to the length of the connecting-rod, and causing the movable slide to move one hundred and eighty degrees instead of ninety degrees, as shown, a substitute for the common link-motion may be obtained. It may also be applied to water-engines in lieu of the common crank, to decrease the speed when the amount of labor required is less than the full power of the motor, as with this device by the same pressure the stroke of the piston can be reduced and an equivalent of labor for an equivalent of water be obtained—a very valuable consideration in water-elevators, &c., where the power required is constantly varying.

The driving-shaft A, preferably, is provided with a bearing in the hub B, and carries at its end the crank C, pitman D, and the counter-balance E.

The counter-balance, crank, and pitman preferably are inclosed in the box F, from which the hub B projects.

Arranged upon the face of the box are the ways G, which inclose on two sides the recess H, which constitutes the guide in directing the movement of the reciprocating sliding head or block I. This sliding head or block I is laid hold of at *d* by one end of the pitman *n*, and at *m* it is connected with the connecting-bar M.

The ways G may be of any desirable shape to receive the sliding block or head. The guide H is allowed a quarter-revolution by means of the lever B', which passes through a slot, *b*, in the support or bearing N, within which the hub is provided with a quarter-revolution.

Projecting from the support N is the arm O. This arm is provided with the guides P P' and the racks R R¹. The upper rack, R, is supplied with a movement limited by the length of the slot R² in the upper arm O, and is held in position by means of the clamping-plate S and start or spindle s. This start or spindle is provided with a handle, S', which screws thereon in opposition to the spring s'. Upon loosening the clamping-plate the rack may be moved to the position desired.

The lower rack, R¹, somewhat longer than the upper rack, is provided at one end with the cross-head T, and is reciprocated in the arm O in the guide P' by means of the connecting-bar M and pinion V on the end of the connecting-bar.

It will be observed that the two racks are conversely arranged, and that the pinion meshes in both.

It will also be observed that by changing the position of the upper rack the relation of the cross-head T, at the end of the connecting-rod M or the pinion V, is varied; and that the mechanism for changing the position of the stroke, but not its length, consists in the upper movable rack, arranged in relation to the pinion so that the same shall mesh with it, and upon its movement move the cross-head upon the lower rack to the desired position.

It will be observed that the variation in the length of stroke is obtained by two instrumentalities, viz: the movable guide, the pinion on the end of the connecting-bar, and rack R¹. By the use of the movable guide H, provided with a quarter-revolution, as set forth, the stroke of the connecting-bar may be varied from a short double stroke, which is given when the guide is perpendicular, to one long stroke, the length of the throw of the sliding head or bar, and that which is obtained when the guide is horizontal and on a line with the connecting-rod. Any degree of variation in length between these two extremes is obtained by changing the inclination of the guide.

It will further be observed that a line coincident with the center of the driving-shaft determines the center of the stroke of the connecting-bar. The lever B' is provided with the clamping-plate $b^1$, and spring $b^2$, and handle $b^3$, for retaining the guide in any desired position or inclination.

In operation, when the guide is vertical, a double stroke is obtained; when the guide is horizontal, the longest stroke is obtained; by means of the racks an increased stroke is obtained, and a change in position of the cross-head is effected.

Of course, the length of the stroke given the pinion or cog is controlled by the length of the connecting-rod and the throw of the sliding block operating it.

The advantages and uses of this invention are very important. By it the length of stroke of a cross-head, feed-motion, or any device for carrying a tool, or a tool, may be instantly changed; the location of such a stroke in relation to the work upon which it is operating may be instantly varied at the will of the operator and while the machine is in operation. By it a cross-head or any other tool-carrying device may be provided with two short strokes at one revolution of the driving-shaft. By it the operator is able to place the limit of stroke where desired without moving the article operated upon, or without changing the position of a feed relative to the tool.

Having thus fully described my invention, I claim and desire to secure by Letters Patent—

1. The within-described means for converting a revolving motion into a reciprocating movement, and for varying the stroke of a connecting-rod, consisting of a driving-shaft, a crank, a pitman, a reciprocating block, a guide capable of revolution, and a connecting-bar, all arranged and combined to operate substantially as described.

2. As a means for varying the stroke of a reciprocating connecting-bar, a reciprocating sliding block, laying hold of one end of the connecting-bar, in combination with a suitable guide provided with means for partial revolution, substantially as and for the purposes described.

3. As a means for determining the position of a cross-head in relation to the end of a reciprocating connecting-bar or other driving mechanism, the adjustable rack R, reciprocating pinion V, and the rack R¹.

4. As a means for increasing the reciprocating stroke of a connecting-bar, the reciprocating pinion V, fastened upon one end of the connecting-bar, and the rack R¹, all arranged to operate substantially as described.

5. The following-described means for varying the stroke of a connecting-bar, for increasing the stroke of a cross-head, and for changing the position of a cross-head in relation to the end of the connecting-bar, consisting in a guide provided with means for partial revolution, as described, a block reciprocating within the slide and laying hold of a connecting-bar, a connecting-bar carrying upon its end a pinion, a stationary rack capable of adjustment, a reciprocating rack, and the reciprocating pinion, all combined and arranged to operate substantially as described.

JOSEPH E. CRISP.

Witnesses:
F. F. RAYMOND, 2d,
GEO. F. WALKER.